(12) United States Patent
Otake et al.

(10) Patent No.: US 9,714,357 B2
(45) Date of Patent: Jul. 25, 2017

(54) PHTHALOCYANINE PIGMENT COMPOSITION AND METHOD FOR PRODUCING THE SAME, AND INK

(71) Applicant: DIC CORPORATION, Tokyo (JP)

(72) Inventors: Hidehiro Otake, Kamisu (JP); Nagatoshi Kobayashi, Kamisu (JP); Taichi Hashiguchi, Kamisu (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/888,490

(22) PCT Filed: Mar. 27, 2014

(86) PCT No.: PCT/JP2014/058813
§ 371 (c)(1),
(2) Date: Nov. 2, 2015

(87) PCT Pub. No.: WO2015/015832
PCT Pub. Date: Feb. 5, 2015

(65) Prior Publication Data
US 2016/0053126 A1 Feb. 25, 2016

(30) Foreign Application Priority Data
Jul. 31, 2013 (JP) .................................. 2013-159030

(51) Int. Cl.
| | |
|---|---|
| *C09D 11/037* | (2014.01) |
| *C09D 17/00* | (2006.01) |
| *C09B 67/04* | (2006.01) |
| *C09B 67/16* | (2006.01) |
| *C09B 67/22* | (2006.01) |
| *C09D 11/03* | (2014.01) |
| *C09D 11/08* | (2006.01) |
| *C09D 11/14* | (2006.01) |
| *C09D 101/18* | (2006.01) |
| *C08K 5/3417* | (2006.01) |

(52) U.S. Cl.
CPC ........ *C09D 17/003* (2013.01); *C09B 67/0002* (2013.01); *C09B 67/0019* (2013.01); *C09B 67/0035* (2013.01); *C09D 11/03* (2013.01); *C09D 11/037* (2013.01); *C09D 11/08* (2013.01); *C09D 11/14* (2013.01); *C09D 17/002* (2013.01); *C09D 101/18* (2013.01); *C08K 5/3417* (2013.01)

(58) Field of Classification Search
CPC ............ C09B 67/0002; C09B 67/0019; C09B 67/0035; C09D 11/30; C09D 11/322; C09D 11/037; C09D 17/003; C09D 17/002
See application file for complete search history.

(56) References Cited

U.S. PATENT DOCUMENTS

| | | | | |
|---|---|---|---|---|
| 3,536,502 A | * | 10/1970 | Von .......................... | C09B 47/24 106/31.76 |
| 5,472,409 A | * | 12/1995 | Hoy ....................... | A61F 5/0123 602/12 |
| 6,306,938 B1 | | 10/2001 | Mathers et al. | |
| 2002/0000177 A1 | | 1/2002 | Mathers et al. | |
| 2003/0213408 A1 | * | 11/2003 | Mochizuki ........... | C09D 11/037 106/410 |
| 2006/0112856 A1 | * | 6/2006 | Brychcy ............. | C09B 67/0016 106/412 |
| 2010/0221654 A1 | * | 9/2010 | Reichwagen ........ | C08K 5/0091 430/108.21 |

FOREIGN PATENT DOCUMENTS

| | | | |
|---|---|---|---|
| GB | WO 2005075577 A1 * | 8/2005 | ......... C09B 67/0016 |
| JP | 4-146968 A | 5/1992 | |
| JP | 2002-512292 A | 4/2002 | |
| JP | 2004-175975 A | 6/2004 | |
| JP | 2006-509081 A | 3/2006 | |

OTHER PUBLICATIONS

International Search Report dated May 20, 2014, issued in counterpart International Application No. PCT/JP2014/058813 (2 pages).

* cited by examiner

*Primary Examiner* — Veronica F Faison
(74) *Attorney, Agent, or Firm* — Westerman, Hattori, Daniels & Adrian, LLP

(57) ABSTRACT

An object is to provide phthalocyanine pigment compositions that have good transparency, gloss, and suitability in the initial viscosity after production as well as outstanding storage stability when used in liquid ink.

A copper phthalocyanine pigment composition containing copper phthalocyanine, a rosin compound, copper phthalocyanine sulfonic acid or its salt, and an aliphatic amine with the calcium content of the pigment composition being 200 ppm or less has good transparency, gloss, and suitability in the initial viscosity after production as well as outstanding storage stability when used in liquid ink.

7 Claims, No Drawings

PHTHALOCYANINE PIGMENT COMPOSITION AND METHOD FOR PRODUCING THE SAME, AND INK

TECHNICAL FIELD

The present invention relates to a phthalocyanine pigment composition and a method for producing the same, and also to a liquid ink containing this phthalocyanine pigment composition.

BACKGROUND ART

An important and required quality of copper phthalocyanine blue pigments for use in liquid inks is viscosity characteristics as a measure of reduced viscosity and dispersion stability of the base ink for the purpose of improved productivity. Inks containing a pigment with poor dispersion stability have a high initial viscosity or, even if having a low initial viscosity, thicken over time. Such a pigment is unsuitable for the production of high-concentration base inks, which are produced with the focus on productivity and diluted and conditioned into liquid inks. Some ways to improve the dispersion stability of such a pigment include controlling the primary particles, optimizing the process for surface treatment, and so forth.

PTL 1 proposes a method that includes forming a crude phthalocyanine pigment into a pre-pigment through the process of dry milling, wet milling, salt kneading, acid pasting, or acid swelling and then treating this pre-pigment in a mixture of water and an organic solvent in combination with a phthalocyanine derivative. PTL 2 proposes a method that includes dry- or wet-milling crude copper phthalocyanine in combination with a resin and a grinding auxiliary, isolating the milled mass, and then subjecting the isolated mass to a conditioning treatment. PTL 3 proposes a pigment dispersion containing a salt of phthalocyanine sulfonic acid and rosin amine and a pigment composition containing this pigment dispersion and phthalocyanine.

With a production method or a pigment composition according to PTL 1 to 3, however, it is impossible to ensure the storage stability of the ink because the copper phthalocyanine sulfonic acid binds to the pigment or calcium contained in the process water before interacting with the organic amine or a similar material added later, resulting in an insufficient effect of treating the surface of the pigment.

CITATION LIST

Patent Literature

PTL 1: Japanese Unexamined Patent Application Publication (Translation of PCT Application) No. 2006-509081
PTL 2: Japanese Unexamined Patent Application Publication (Translation of PCT Application) No. 2002-512292
PTL 3: Japanese Unexamined Patent Application Publication No. 4-146968

SUMMARY OF INVENTION

Technical Problem

An object of the present invention is to provide phthalocyanine pigment compositions that have good transparency, gloss, and suitability in the initial viscosity after production as well as outstanding storage stability when used in liquid ink, in particular, a phthalocyanine pigment composition that exhibits outstanding storage stability in viscosity in a base ink, which contains a high concentration of pigment, for liquid ink.

Solution to Problem

Conducting extensive research in light of these circumstances, the inventors found that a copper phthalocyanine pigment composition containing copper phthalocyanine, a rosin compound, copper phthalocyanine sulfonic acid or its salt, and an aliphatic amine with the calcium content of the pigment composition being 200 ppm or less has good transparency, gloss, and suitability in the initial viscosity after production as well as outstanding storage stability when used in liquid ink.

Furthermore, a method for producing a copper phthalocyanine pigment composition is provided that has a first step including dry-milling crude copper phthalocyanine into a pre-pigment and a second step including treating the pre-pigment obtained in the first step by mixing it with an organic solvent or a liquid mixture of an organic solvent and water in the presence of copper phthalocyanine sulfonic acid or its salt.

A method for producing a copper phthalocyanine pigment composition is also provided in which the calcium content of process water used in the second step is 10 ppm or less.

A method for producing a copper phthalocyanine pigment composition is also provided in which in the second step, the liquid mixture of an organic solvent and water is an emulsion conditioned with the rosin compound.

Moreover, a base ink for liquid ink is provided that contains 20% or more the aforementioned copper phthalocyanine pigment composition.

A base ink for liquid ink is also provided that contains 20% or more copper phthalocyanine pigment composition obtained in the aforementioned method for producing a copper phthalocyanine pigment composition.

Furthermore, a base ink for liquid ink is provided in which the base ink for liquid ink is based on nitrocellulose resin.

Advantageous Effects of Invention

When used in liquid ink, a copper phthalocyanine pigment composition containing copper phthalocyanine, a rosin compound, copper phthalocyanine sulfonic acid or its salt, and an aliphatic amine with the calcium content of the pigment composition being 200 ppm or less has good transparency, gloss, and suitability in the initial viscosity after production as well as outstanding storage stability.

DESCRIPTION OF EMBODIMENTS

The following describes the present invention in detail.

The present invention provides the intended pigment composition containing copper phthalocyanine, a rosin compound, copper phthalocyanine sulfonic acid or its salt, and an aliphatic amine with the calcium content of the pigment composition being 200 ppm or less through a first step that includes dry-milling crude copper phthalocyanine into a pre-pigment and treating the pre-pigment obtained in the first step by mixing it with an organic solvent or a liquid mixture of an organic solvent and water in the presence of copper phthalocyanine sulfonic acid or its salt.

The crude copper phthalocyanine used in the present invention can be obtained through, for example, a reaction between phthalic anhydride or its derivative, urea or its derivative, and a source of metallic copper or a reaction between phthalodinitrile and a source of metallic copper.

Examples of phthalic acid derivatives that can be used in such a case include phthalic acid salts, phthalic anhydride, phthalimide, phthalamic acid and its salts or esters, and phthalonitrile. For urea derivatives, examples include urea and ammonia. As for metal sources, examples include metallic copper, cuprous or cupric halides, copper oxide, copper sulfate, copper sulfide, and copper hydroxide. As for catalysts, examples include molybdenum compounds such as ammonium molybdate and molybdenum oxide, titanium compounds such as titanium tetrachloride and titanic acid esters, zirconium compounds such as zirconium chloride and zirconium carbonate, antimony oxide, and boric acid. As for organic solvents, examples include aromatic hydrocarbons such as alkylbenzenes and alkylnaphthalenes, alicyclic hydrocarbons such as alkylcyclohexanes and decalin, aliphatic hydrocarbons such as decane and dodecane, aromatic nitro compounds such as nitrobenzene and nitrotoluene, and aromatic halogenated hydrocarbons such as trichlorobenzene and chloronaphthalene.

The production of crude phthalocyanine according to the aforementioned production process is accomplished by heating the raw materials listed above at, for example, 180° C. to 300° C. for 1 to 5 hours with or without an organic solvent and optionally with a catalyst.

The crude copper phthalocyanine obtained through this synthesis step may optionally be purified. The salts and the derivatives of raw materials produced during the synthesis step can be washed away with alkaline and/or acidic aqueous solutions and/or organic solvents. The method according to the present invention supports both forms of crude copper phthalocyanine, i.e., the crude form containing salts and derivatives of raw materials and the purified form that is free of salts and derivatives of raw materials. The crude copper phthalocyanine used in the present invention is in the β-crystalline form, and it is preferred that its purity be 97%, in particular, 98% or more.

Furthermore, purifying the crude copper phthalocyanine with process water whose calcium content is 10 ppm or less, preferably 1 ppm or less, reduces the calcium content of the crude copper phthalocyanine. When a process water with a calcium content of 1 ppm or less is used, waters such as distilled water, ion-exchanged water, softened water, and reverse osmosis-treated water and treated waters obtained through a combination of such treatments can be employed as the process water. Purification with such process water provides crude copper phthalocyanine whose calcium content is 150 ppm or less, preferably 100 ppm or less.

The following describes the first step, which includes dry-milling the obtained crude copper phthalocyanine pigment into a pre-pigment.

It is preferred that the temperature at which the crude copper phthalocyanine is milled in the present invention be 200° C. or less, in particular, 60° C. to 130° C. The milling method used in the present invention can be a conventional dry method. Examples of mills that can be used in this milling operation include ones containing beads, rods, or similar media. In general, a glass or metal medium is used. Any mill that allows the user to control the temperature while it is in the milling state, but the milling temperature can also be managed through the control of the speed of rotation of the milling medium.

Examples of mills that can be used include an attritor, a vibration mill, and a ball mill. In particular, the use of an attritor is preferred given its productivity and the ease of managing the milling temperature with it.

If the crude copper phthalocyanine is dry-milled, the conditions are not limited. However, it is preferred that the crude copper phthalocyanine be dry-milled with the peripheral speed of rotation of the impeller in the range of 1 to 20 m/sec, more preferably 1.2 to 10 m/sec, in cases where the aforementioned attritor, for example, is used. The length of time required for this milling operation is not limited, but it is usually in the range of a few minutes to a few hours.

Dry milling is based on the milling force or destructive force produced by, for example, the medium itself or the medium and the vessel wall. Examples of milling machines include known methods such as an attritor, a ball mill, and a vibration mill. Where necessary, the inside of the mill may be filled with an atmosphere of nitrogen gas, argon gas, or any other inert gas. It is also possible to use a dispersing machine selected from bead mills including known methods such as DYNO-Mill, DRAIS Mill, and a sand grinder. The pre-pigment obtained in this way is a crystal mixture composed of α-crystals and β-crystals. The ratio of α-crystals to β-crystals (α/β ratio) as determined by X-ray diffraction is not limited, but it is preferably in the range of 30/70 to 80/20, more preferably 50/50 to 65/35.

The following describes a second step, which includes treating the pre-pigment according to the present invention by mixing it with an organic solvent or a liquid mixture of an organic solvent and water in the presence of copper phthalocyanine sulfonic acid or its salt.

One or more of copper phthalocyanine sulfonic acid and its salts can be used in the second step, selected from the group consisting of copper phthalocyanine sulfonic acid, alkali metal salts of copper phthalocyanine sulfonic acid, aliphatic primary amine salts of copper phthalocyanine sulfonic acid, aliphatic secondary amine salts of copper phthalocyanine sulfonic acid, aliphatic tertiary amine salts of copper phthalocyanine sulfonic acid, and quaternary ammonium salts of copper phthalocyanine sulfonic acid. In particular, alkali metal salts of copper phthalocyanine sulfonic acid are preferred.

The copper phthalocyanine sulfonic acid or salt thereof may have any number of substituents at the sulfonic acid residues. The presence of too many substituents, however, leads to increased solubility in water or organic solvents and makes insolubilization difficult, thereby causing the expected effects of the treatment to be lost. Thus, it is preferred that the number of substituents be in the range of 1 to 3.

The copper phthalocyanine sulfonic acid or salt thereof may be dissolved in water and/or an organic solvent before use. If dissolved before use, alkali metal salts of copper phthalocyanine sulfonic acid, for example, which are highly soluble in water, are particularly preferred because they provide a highly uniform copper phthalocyanine composition. A preferred method for preparing an alkali metal salt of copper phthalocyanine sulfonic acid is to disperse copper phthalocyanine sulfonic acid in 10 to 100 times the volume of water and then condition the resulting dispersion with a base, such as sodium hydroxide or potassium hydroxide, in an alkaline atmosphere of pH 8 to 12 before use. The pH range of 8 to 10.8 is most preferred for uniform treatment because strong alkalinity generally leads to reduced solubility of the alkali metal salt of copper phthalocyanine sulfonic acid.

When the amount of the copper phthalocyanine sulfonic acid or salt thereof is too small, the dispersibility of the resulting pigment can be insufficient, and when it is too large, the crystallinity can be insufficient. In order for the pigment to have sufficient crystallinity and perform well in terms of viscosity, transparency, and tinting strength, it is preferred that the amount of the copper phthalocyanine sulfonic acid or salt thereof added be in the range of 2% to 20% with respect to the pre-pigment, more preferably 3% to 11%.

In mixing the pre-pigment in an organic solvent or a liquid mixture of an organic solvent and water, the pre-pigment may be in any form. The pre-pigment can be in the form of a dry powder (dry), a water-containing wet cake, or slurry of the pre-pigment suspended in water. An appropriate form can be selected for the desired productivity and handling.

As for when to feed the pre-pigment, the planned quantity of the pre-pigment can be put into a liquid medium in a reactor all at an early stage, in two or multiple divided portions in the second step, or continuously in small amounts using a feeder, with the liquid medium preheated to a certain temperature. In particular, feeding the pre-pigment in two or multiple divided portions is preferred because this ensures the resulting ink has lower initial and aged viscosity.

The heating of the pre-pigment in the present invention is performed in the temperature range of 60° C. to 150° C., where the pre-pigment as a crystal mixture composed of α-crystals and β-crystals readily undergoes crystal transformation into β-crystals. A more preferred temperature range where the pre-pigment can be heated is 80° C. to 110° C. In particular, a temperature range of 80° C. to 97° C. is suitable for keeping the size of forming crystals in the range of 50 to 150 nanometers, which provides good transparency and tinting strength to the copper phthalocyanine pigment composition for liquid ink, while making the pre-pigment as a crystal mixture composed of α-crystals and β-crystals transform into a β-crystalline form of pigment. The duration of heating, which is not limited and can be any length of time suitable for making the pre-pigment transform into β-crystals and keeping them at the intended crystal size, is in the range of a few minutes to a few hours.

The liquid medium used in the second step can be an organic solvent or a liquid mixture of an organic solvent and water.

Examples of the organic solvent include aromatic compounds such as benzene, toluene, xylene, and nitrobenzene, aliphatic hydrocarbon compounds such as heptane, hexane, petroleum benzine, mineral spirits, and kerosine, alcohols such as isopropanol, butanol, isobutanol, heptanol, isoheptanol, and diethylene glycol, ketones such as acetone, methyl ethyl ketone, and methyl isobutyl ketone, esters such as ethyl acetate, butyl acetate, and butyl cellosolve acetate, and ethers such as tetrahydrofuran. In particular, xylene is preferred because it is 1) highly effective in making the pre-pigment transform into a β-crystalline form of pigment and 2) gives pigment particles having a small aspect ratio, which are of low thixotropy and appropriate for the development of good suitability for printing when used as liquid ink. The organic solvent can be a single organic solvent or a solvent mixture composed of multiple solvents.

In the liquid mixture of an organic solvent and water, the organic solvent and water can be mixed in any ratio that ensures the mixture is effective in crystal growth and treatment for particle uniformity. For a degree of crystallinity and a crystal size that ensure good transparency and tinting strength, however, it is preferred that the organic solvent: water ratio by mass be in the range of 0.5:99.5 to 3:97.

The liquid mixture of an organic solvent and water can also be used in the form of emulsion. Examples of surfactants that can be used in preparing the emulsion include all commercially available surfactants. Any nonionic, anionic, cationic, or amphoteric surfactant can be used that allows water and the organic solvent to form emulsion, but it is preferred to use a rosin compound as a surfactant because rosin compounds emulsify organic solvents, in particular, xylene, and water and have no adverse effects due to suitability for printing or the suitability of coatings as prints.

The production of the emulsion using a rosin compound is not limited to any particular method. For example, the rosin compound is dissolved in water by a factor of 10 to 100 heated at 60° C. to 100° C. in an alkaline atmosphere using a base such as sodium hydroxide or potassium hydroxide, conditioning an aqueous rosin solution. Then an organic solvent such as xylene is added to the aqueous rosin solution, yielding a solution of an emulsion of the organic solvent. It is preferred that the pH of the rosin solution be in the range of 8 to 10.8 so that the alkali separation of the rosin can be prevented, and it is more preferred that the heating temperature be in the range of 70° C. to 94° C.

Rosin compounds that can be used include rosin, disproportionated rosin, hydrogenated rosin, polymerized rosin, and Vinsol resin. In particular, disproportionated rosin and hydrogenated rosin are preferred.

It is preferred that the amount of the rosin compound added be in the range of 2% to 20% with respect to the pre-pigment, more preferably 3% to 10% because this allows the pre-pigment to disperse well in the aqueous slurry used in the second step, thereby ensuring uniform treatment.

As for the proportions of the pre-pigment and the liquid medium, the liquid medium/pre-pigment ratio as a ratio by mass with respect to the pre-pigment is in the range of 2 to 100, preferably 2 to 20 for a good state of stirring that influences production efficiency, production cost, and the transparency and tinting strength of the resulting pigment, more preferably 3 to 10.

Aliphatic amines that can be used in the present invention include aliphatic primary amines ($R_1NH_2$, where $R_1$ represents an alkyl group having 8 to 18 carbon atoms), aliphatic secondary amines ($R_1R_2NH$, where $R_1$ and $R_2$ represent alkyl groups having 8 to 18 carbon atoms), aliphatic tertiary amines ($R_1R_2R_3N$, where $R_1$ and $R_2$ represent methyl groups, and $R_3$ represents an alkyl group having 8 to 22 carbon atoms), and quaternary ammonium salts ($R_1R_2R_3R_4N^+C^-$, where $R_1$ and $R_2$ represent methyl groups, and $R_3$ and $R_4$ represent alkyl groups having 8 to 18 carbon atoms).

It is preferred that the amount of the aliphatic amine added be in the range of 0.1% to 10% with respect to the pre-pigment, more preferably 0.1% to 3%. The amount of the aliphatic amine added can be determined using the degree of neutralization of the copper phthalocyanine sulfonic acid or salt thereof used based on the number of sulfonic acid residues with hydrogen bonds. To make sure that the aliphatic amine forms hydrogen bonds with the sulfonic acid residues and thereby to obtain a pigment having the intended transparency, tinting strength, and dispersion stability, it is preferred that the ratio of the number of moles of the aliphatic amine to the number of moles of sulfonic acid residues (degree of neutralization) be in the range of 0.2 to 0.8, more preferably 0.4 to 0.7.

The process water used in the present invention needs to be a water with low calcium content, and it is preferred that the calcium content of the process water be 10 ppm or less, in particular, 1 ppm or less. It is preferred that the process water with low calcium content be, for example, purified water, softened water, ion-exchanged water, distilled water, or reverse osmosis-treated water.

As a result of extensive research, the inventors found that removing factors that inhibit the copper phthalocyanine sulfonic acid and the aliphatic amine from forming hydrogen bonds or chemical bonds is important for the viscosity of the ink, in particular, storage stability in viscosity. The following describes this in detail.

A very important thing for the viscosity of the ink, in particular, storage stability in viscosity, is that the copper phthalocyanine sulfonic acid and the aliphatic amine should form hydrogen bonds or chemical bonds during the surface treatment of the copper phthalocyanine pigment. In other words, the copper phthalocyanine sulfonic acid and the aliphatic amine form hydrogen bonds or ionic bonds as in an example where an aliphatic primary amine is used (General Formula 1), an example where an aliphatic secondary amine is used (General Formula 2), an example where an aliphatic tertiary amine is used (General Formula 3), and an example where an aliphatic quaternary ammonium is used (General Formula 4).

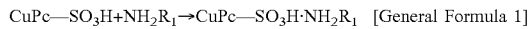
CuPc—SO$_3$H+NH$_2$R$_1$→CuPc—SO$_3$H·NH$_2$R$_1$  [General Formula 1]

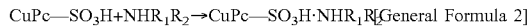
CuPc—SO$_3$H+NHR$_1$R$_2$→CuPc—SO$_3$H·NHR$_1$R$_2$  [General Formula 2]

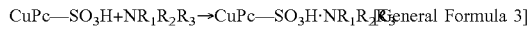
CuPc—SO$_3$H+NR$_1$R$_2$R$_3$→CuPc—SO$_3$H·NR$_1$R$_2$R$_3$  [General Formula 3]

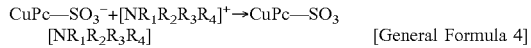
CuPc—SO$_3^-$+[NR$_1$R$_2$R$_3$R$_4$]$^+$→CuPc—SO$_3$[NR$_1$R$_2$R$_3$R$_4$]  [General Formula 4]

CuPc represents a copper phthalocyanine residue, and R$_1$ to R$_4$ represent alkyl groups.

If calcium ions are present in the system, the copper phthalocyanine sulfonic acid and the calcium ions form a salt through chemical bonding, inhibiting the formation of hydrogen bonds or chemical bonds between the copper phthalocyanine sulfonic acid and the aliphatic amine. Calcium salts of copper phthalocyanine sulfonic acid have affected the viscosity of inks, in particular, storage stability in viscosity. General Formula 5 below represents an example where an aliphatic primary amine is used.

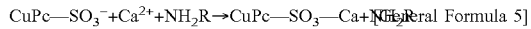
CuPc—SO$_3^-$+Ca$^{2+}$+NH$_2$R→CuPc—SO$_3$—Ca+NH$_2$R  [General Formula 5]

After much research based on this discussion, the inventors found that it is preferred that in a copper phthalocyanine pigment composition, the amount of calcium derived from the crude copper phthalocyanine, copper phthalocyanine sulfonic acid or salt thereof, and process water used for production be 200 ppm or less, more preferably 150 ppm or less, in particular, 100 ppm or less.

The calcium content of the copper phthalocyanine pigment composition can be measured by fluorescent X-ray spectrometry, and that of the process water by ICP emission spectrometry.

Copper phthalocyanine pigment compositions obtained in this way can be used in printing inks, paints, colored resin-molded articles, and so forth as well as for applications such as toners for electrostatic charge image development and inks for inkjet recording.

Copper phthalocyanine pigment compositions according to the present invention and copper phthalocyanine pigment compositions obtained using a method according to the present invention for producing a copper phthalocyanine pigment composition provide liquid inks having good initial viscosity, hue, and tinting strength as well as good storage stability. A liquid ink can be prepared by mixing a copper phthalocyanine composition obtained using a production method according to the present invention with known and commonly used binder resins, solvents, additives, and so forth through a conventional preparation method. In more specific terms, a liquid ink can be conditioned through the conditioning of a base ink for liquid ink, i.e., an ink containing a high concentration of pigment, and the use of binders, solvents, additives, and so forth.

Copper phthalocyanine pigment compositions according to the present invention, enabling the production of highly fluidic, low-viscosity base inks for nitrocellulose resin-based liquid inks, are suitable for use as organic pigment compositions for gravure printing inks and flexographic inks. A base ink for nitrocellulose resin-based liquid inks is composed of nitrocellulose resin (nitrogen content: 10.7 to 12.2), solvent, and pigment, and its pigment concentration is 20% or more. Adding binder resins, solvent, and additives to this base ink for nitrocellulose resin-based liquid inks provides a liquid ink. Examples of binders that can be used include nitrocellulose resins, polyamide resins, and polyurethane resins, and examples of solvents that can be used include methanol, ethanol, isopropyl alcohol, propanol, butanol, ethyl acetate, toluene, and methyl ethyl ketone.

EXAMPLES

The following describes the present invention in more detail with reference to Examples and Comparative examples. All instances of parts and % are based on mass. As a matter of course, the present invention is not limited to the following Examples only.

Example 1

(First Step: Dry Milling)

Five hundred parts of crude copper phthalocyanine (purity, 97.5%; calcium content, 15 ppm) was dry-milled using a dry 5-L attritor containing 13500 parts of ⅜-inch steel beads at 95° C. for 60 minutes, yielding a pre-pigment containing 55% α-crystals (calcium content: 15 ppm).

(Second Step: Pigmentation)

Fifteen parts of copper phthalocyanine sulfonic acid (the number of substituted sulfonic acid residues: 1.0), 15 parts of hydrogenated rosin, and a 25% aqueous sodium hydroxide solution were added to 1500 parts of ion-exchanged water (calcium content: 0.01 ppm or less), and the resulting mixture was heated to 80° C. and stirred, yielding a pH 9.5 alkaline solution of copper phthalocyanine sulfonic acid and hydrogenated rosin. The copper phthalocyanine sulfonic acid and the hydrogenated rosin individually form sodium salt in the alkaline aqueous solution. Then 200 parts of the pre-pigment was added, 15 parts of xylene was added at a temperature of 93° C., and the resulting mixture was stirred under reflux at 93° C. for 8 hours to form pigment.

(Solvent Distillation and Posttreatment Steps)

After the 8-hour pigmentation, xylene was distilled away, ion-exchanged water was added to the resulting pigment slurry to make the liquid volume 4000 parts, and the pH was adjusted to 4.6 with acetic acid, yielding copper phthalocyanine pigment slurry. Then an aqueous treating agent solution containing 2.1 parts of lauryl amine in 300 parts of ion-exchanged water adjusted to acetic acid acidity was added to the copper phthalocyanine pigment slurry, yielding treated slurry. Having been obtained, the treated slurry was filtered, and a copper phthalocyanine blue pigment (calcium content: 30 ppm) was obtained through the steps of washing with 8 L of ion-exchanged water, drying, and pulverizing.

Example 2

(First Step)

The pre-pigment obtained in the first step of Example 1 was used.

Fifteen parts of copper phthalocyanine sulfonic acid (the number of substituted sulfonic acid residues: 1.0) was peptized in 400 parts of ion-exchanged water (calcium content: 0.01 ppm or less) to form slurry. A 25% aqueous sodium hydroxide solution was added to this slurry, and the resulting mixture was heated to 90° C. and stirred, yielding a pH 9.5 alkaline solution of copper phthalocyanine sulfonic acid. Then the pre-pigment obtained in the first step of Example 1 was added to the alkaline solution of copper phthalocyanine sulfonic acid to form pre-pigment slurry.

Fifteen parts of hydrogenated rosin was added to 600 parts of ion-exchanged water, a 25% aqueous sodium hydroxide solution was added, and the resulting mixture was heated and stirred at 80° C., yielding a pH 9.5 alkaline solution of rosin. The alkaline solution of rosin was stirred with 15 parts of xylene to form a solution of xylene emulsion.

(Second Step)

The solution of xylene emulsion was heated to 93° C. The pre-pigment slurry was added to the solution of xylene emulsion, and the resulting mixture was stirred under reflux at 93° C. for 8 hours to form pigment.

(Solvent Distillation and Posttreatment Steps)

After the 8-hour pigmentation, xylene was distilled away, ion-exchanged water was added to the resulting pigment slurry to make the liquid volume 4000 parts, and the pH was adjusted to 4.6 with acetic acid, yielding copper phthalocyanine pigment slurry. Then an aqueous treating agent solution containing 2.1 parts of lauryl amine in 300 parts of ion-exchanged water adjusted to acetic acid acidity was added to the copper phthalocyanine pigment slurry, yielding treated slurry. Having been obtained, the treated slurry was filtered, and a copper phthalocyanine blue pigment (calcium content: 30 ppm) was obtained through the steps of washing with 8 L of ion-exchanged water, drying, and pulverizing.

Example 3

(First Step)

The pre-pigment obtained in the first step of Example 1 was used.

Fifteen parts of copper phthalocyanine sulfonic acid (the number of substituted sulfonic acid residues: 1.0) was peptized in 400 parts of ion-exchanged water (calcium content: 0.01 ppm or less) to form slurry. A 25% aqueous sodium hydroxide solution was added to this slurry, and the resulting mixture was heated to 80° C. and stirred, yielding a pH 9.5 alkaline solution of copper phthalocyanine sulfonic acid. Then the pre-pigment obtained in the first step of Example 1 was added to the alkaline solution of copper phthalocyanine sulfonic acid to form pre-pigment slurry. This pre-pigment slurry was divided into three fractions.

Fifteen parts of hydrogenated rosin was added to 600 parts of ion-exchanged water, a 25% aqueous sodium hydroxide solution was added, and the resulting mixture was heated and stirred at 80° C., yielding a pH 9.5 alkaline solution of rosin. The alkaline solution of rosin was stirred with 15 parts of xylene to form a solution of xylene emulsion.

(Second Step)

The solution of xylene emulsion was heated to 93° C. One-third the amount of the pre-pigment slurry was added to the solution of xylene emulsion, and the resulting mixture was stirred at 93° C. for 2 hours. Then another third of the amount of the pre-pigment slurry was added, and the resulting mixture was stirred at 93° C. for 2 hours. Then another third of the amount of the pre-pigment slurry was added, and the resulting mixture was stirred under reflux at 93° C. for 4 hours to form pigment.

(Solvent Distillation and Posttreatment Steps)

After the 8-hour pigmentation, xylene was distilled away, ion-exchanged water was added to the resulting pigment slurry to make the liquid volume 4000 parts, and the pH was adjusted to 4.6 with acetic acid, yielding copper phthalocyanine pigment slurry. Then an aqueous treating agent solution containing 2.1 parts of lauryl amine in 300 parts of ion-exchanged water adjusted to acetic acid acidity was added to the copper phthalocyanine pigment slurry, yielding treated slurry. Having been obtained, the treated slurry was filtered, and a copper phthalocyanine blue pigment (calcium content: 30 ppm) was obtained through the steps of washing with 8 L of ion-exchanged water, drying, and pulverizing.

Example 4

(First Step)

Five hundred parts of crude copper phthalocyanine (calcium content: 110 ppm) was dry-milled using a dry 5-L attritor containing 13500 parts of ⅜-inch steel beads at 95° C. for 60 minutes, yielding a pre-pigment containing 55% α-crystals (calcium content: 110 ppm).

(Second Step: Pigmentation)

Fifteen parts of copper phthalocyanine sulfonic acid (the number of substituted sulfonic acid residues: 1.0), 15 parts of hydrogenated rosin, and a 25% aqueous sodium hydroxide solution were added to 1500 parts of ion-exchanged water (calcium content: 0.01 ppm or less), and the resulting mixture was heated to 80° C. and stirred, yielding a pH 9.5 alkaline solution of copper phthalocyanine sulfonic acid and hydrogenated rosin. Then 200 parts of the pre-pigment was added, 15 parts of xylene was added at a temperature of 93° C., and the resulting mixture was stirred under reflux at 93° C. for 8 hours to form pigment.

(Solvent Distillation and Posttreatment steps)

After the 8-hour pigmentation, xylene was distilled away, ion-exchanged water was added to the resulting pigment slurry to make the liquid volume 4000 parts, and the pH was adjusted to 4.6 with acetic acid, yielding copper phthalocyanine pigment slurry. Then an aqueous treating agent solution containing 2.1 parts of lauryl amine in 300 parts of ion-exchanged water adjusted to acetic acid acidity was added to the copper phthalocyanine pigment slurry, yielding treated slurry. Having been obtained, the treated slurry was filtered, and a copper phthalocyanine blue pigment (calcium content: 130 ppm) was obtained through the steps of washing with 8 L of ion-exchanged water, drying, and pulverizing.

Example 5

(First Step)

The pre-pigment obtained in the first step of Example 1 was used.

(Second step: Pigmentation)

Fifteen parts of copper phthalocyanine sulfonic acid (the number of substituted sulfonic acid residues: 1.0), 15 parts of hydrogenated rosin, and a 25% aqueous sodium hydroxide solution were added to 1500 parts of softened water (calcium content: 4 ppm), and the resulting mixture was heated to 80° C. and stirred, yielding a pH 9.5 alkaline solution of copper phthalocyanine sulfonic acid and hydrogenated rosin. Then 200 parts of the pre-pigment was added, 15 parts of xylene was added at a temperature of 93° C., and the resulting mixture was stirred under reflux at 93° C. for 8 hours to form pigment.

After the 8-hour pigmentation, xylene was distilled away, softened water was added to the resulting pigment slurry to make the liquid volume 4000 parts, and the pH was adjusted to 4.6 with acetic acid, yielding copper phthalocyanine pigment slurry. Then an aqueous treating agent solution containing 2.1 parts of lauryl amine in 300 parts of softened water adjusted to acetic acid acidity was added to the copper phthalocyanine pigment slurry, yielding treated slurry. Having been obtained, the treated slurry was filtered, and a copper phthalocyanine blue pigment (calcium content: 170 ppm) was obtained through the steps of washing with 8 L of ion-exchanged water, drying, and pulverizing.

Example 6

(First Step)

The pre-pigment obtained in the first step of Example 1 was used.

(Second Step: Pigmentation)

Nine parts of copper phthalocyanine sulfonic acid (the number of substituted sulfonic acid residues: 1.0), 15 parts of hydrogenated rosin, and a 25% aqueous sodium hydroxide solution were added to 1500 parts of ion-exchanged water (calcium content: 0.01 ppm or less), and the resulting mixture was heated to 80° C. and stirred, yielding a pH 9.5 alkaline solution of copper phthalocyanine sulfonic acid and hydrogenated rosin. Then 200 parts of the pre-pigment was added, 15 parts of xylene was added at a temperature of 93° C., and the resulting mixture was stirred under reflux at 93° C. for 8 hours to form pigment.

(Solvent Distillation and Posttreatment Steps)

After the 8-hour pigmentation, xylene was distilled away, ion-exchanged water was added to the resulting pigment slurry to make the liquid volume 4000 parts, and the pH was adjusted to 4.6 with acetic acid, yielding copper phthalocyanine pigment slurry. Then an aqueous treating agent solution containing 2.1 parts of lauryl amine in 300 parts of ion-exchanged water adjusted to acetic acid acidity was added to the copper phthalocyanine pigment slurry, yielding treated slurry. Having been obtained, the treated slurry was filtered, and a copper phthalocyanine blue pigment (calcium content: 25 ppm) was obtained through the steps of washing with 8 L of ion-exchanged water, drying, and pulverizing.

Comparative Example 1

(First Step: Dry Milling)

Five hundred parts of crude copper phthalocyanine (calcium content: 200 ppm) was dry-milled using a dry 5-L attritor containing 13500 parts of ⅜-inch steel beads at 95° C. for 60 minutes, yielding a pre-pigment containing 53% α-crystals (calcium content: 200 ppm).

(Second Step: Pigmentation)

Fifteen parts of copper phthalocyanine sulfonic acid (the number of substituted sulfonic acid residues: 1.0), 15 parts of hydrogenated rosin, and a 25% aqueous sodium hydroxide solution were added to 1500 parts of tap water (calcium content: 15 ppm), and the resulting mixture was heated to 80° C. and stirred, yielding a pH 9.5 alkaline solution of copper phthalocyanine sulfonic acid and hydrogenated rosin. Then 200 parts of the pre-pigment was added, 15 parts of xylene was added at a temperature of 93° C., and the resulting mixture was stirred under reflux at 93° C. for 8 hours to form pigment.

(Solvent Distillation and Posttreatment Steps)

After the 8-hour pigmentation, xylene was distilled away, industrial water was added to the resulting pigment slurry to make the liquid volume 4000 parts, and the pH was adjusted to 4.6 with acetic acid, yielding copper phthalocyanine pigment slurry. Then an aqueous treating agent solution containing 2.1 parts of lauryl amine in 300 parts of industrial water adjusted to acetic acid acidity was added to the copper phthalocyanine pigment slurry, yielding treated slurry. Having been obtained, the treated slurry was filtered, and a copper phthalocyanine blue pigment (calcium content: 950 ppm) was obtained through the steps of washing with 8 L of industrial water, drying, and pulverizing.

Comparative Example 2

(First Step)

The pre-pigment obtained in the first step of Comparative Example 1 was used.

Fifteen parts of copper phthalocyanine sulfonic acid (the number of substituted sulfonic acid residues: 1.0) was peptized in 400 parts of industrial water (calcium content: 40 ppm) to form slurry. A 25% aqueous sodium hydroxide solution was added to this slurry, and the resulting mixture was heated to 80° C. and stirred, yielding a pH 9.5 alkaline solution of copper phthalocyanine sulfonic acid. Then the pre-pigment obtained in the first step of Comparative Example 1 was added to the alkaline solution of copper phthalocyanine sulfonic acid to form pre-pigment slurry.

Fifteen parts of hydrogenated rosin was added to 600 parts of industrial water, a 25% aqueous sodium hydroxide solution was added, and the resulting mixture was heated and stirred at 80° C., yielding a pH 9.5 alkaline solution of rosin. The alkaline solution of rosin was stirred with 15 parts of xylene to form a solution of xylene emulsion.

(Second Step)

The solution of xylene emulsion was heated to 93° C. The pre-pigment slurry was added to the solution of xylene emulsion, and the resulting mixture was stirred under reflux at 93° C. for 8 hours to form pigment.

(Solvent Distillation and Posttreatment Steps)

After the 8-hour pigmentation, xylene was distilled away, industrial water was added to the resulting pigment slurry to make the liquid volume 4000 parts, and the pH was adjusted to 4.6 with acetic acid, yielding copper phthalocyanine pigment slurry. Then an aqueous treating agent solution containing 2.1 parts of lauryl amine in 300 parts of industrial water adjusted to acetic acid acidity was added to the copper phthalocyanine pigment slurry, yielding treated slurry. Having been obtained, the treated slurry was filtered, and a copper phthalocyanine blue pigment (calcium content: 1300 ppm) was obtained through the steps of washing with 8 L of industrial water, drying, and pulverizing.

(Initial/Aged Viscosity Testing Using Liquid Inks)

(Conditioning of Nitrocellulose Resin solution)

Twenty-four parts by weight of nitrocellulose resin (an industrial nitrocellulose resin of class L1/16 according to JIS K6703-1995 standards; nitrogen content, 10.7 to 11.2; containing 30% isopropyl alcohol as humectant) and 4 parts by weight of DOP (dioctyl phthalate) were added to 125 parts by weight of ethanol and stirred and dissolved, yielding a nitrocellulose resin solution for liquid ink.

(Conditioning of Test Inks and Initial/Aged Viscosity Testing)

A test base ink was obtained by putting 28 parts by weight of a pigment obtained in Examples 1 to 6 and Comparative Examples 1 to 2, 72 parts by weight of the nitrocellulose resin solution, and 150 parts by weight of zirconia beads into a 200-ml glass bottle and dispersing them using a paint conditioner for 45 minutes. This test base ink was left in a thermostatic water bath at a temperature setting of 20° C. for 1 hour, and then the initial viscosity was measured using a BROOKFIELD viscometer (a type-B viscometer) at a number of revolutions of the rotor of 6. After being stored at room temperature for 1 day, the test base ink was left in a thermostatic water bath at a temperature setting of 20° C. for 1 hour, and then the aged viscosity was measured using the type-B viscometer. The measurements are expressed in units of mPa·sec, and it is preferred that both initial and aged viscosity be low. The temporal thickening factor is an aged viscosity/initial viscosity ratio, and smaller temporal thickening factors represent better stability of dispersion due to storage.

The following table (Table 1) summarizes the results for Examples 1 to 6 and Comparative Examples 1 to 2 above.

TABLE 1

|  | Initial viscosity | Aged viscosity | Temporal thickening factor |
| --- | --- | --- | --- |
| Example 1 | 970 | 2140 | 2.21 |
| Example 2 | 830 | 1780 | 2.14 |
| Example 3 | 745 | 1540 | 2.07 |
| Example 4 | 1210 | 3650 | 3.02 |
| Example 5 | 1370 | 5080 | 3.71 |
| Example 6 | 1250 | 2920 | 2.34 |
| Comparative Example 1 | 2090 | 15800 | 7.56 |
| Comparative Example 2 | 2350 | 24400 | 10.38 |

The results in Table 1 indicate that with the pigments of Examples 1 to 6 obtained using methods specified in the present invention and containing 20 ppm or less calcium, as compared with the pigments of Comparative Examples 1 and 2 obtained using conventional methods, the initial viscosity was low, the aged viscosity after 1-day storage at room temperature was low, the temporal thickening factor defined as a ratio of initial viscosity to aged viscosity was also low, and the dispersion stability of the ink was good.

The invention claimed is:

1. A copper phthalocyanine pigment composition comprising copper phthalocyanine, a rosin compound, copper phthalocyanine sulfonic acid or a salt thereof, and an aliphatic amine, a calcium content of the pigment composition being 200 ppm or less.

2. A method for producing the copper phthalocyanine pigment composition according to claim 1, the method comprising a first step including dry-milling crude copper phthalocyanine into a pre-pigment and a second step including treating the pre-pigment obtained in the first step by mixing the pre-pigment with an organic solvent or a liquid mixture of an organic solvent and water in the presence of copper phthalocyanine sulfonic acid or a salt thereof.

3. The method for producing a copper phthalocyanine pigment composition according to claim 2, wherein a calcium content of process water used in the second step is 10 ppm or less.

4. The method for producing a copper phthalocyanine pigment composition according to claim 2, wherein in the second step, the liquid mixture of an organic solvent and water is an emulsion conditioned with the rosin compound.

5. A base ink for liquid ink, the base ink comprising 20% or more the copper phthalocyanine pigment composition according to claim 1.

6. A base ink for liquid ink, the base ink comprising 20% or more copper phthalocyanine pigment composition obtained in the method for producing a copper phthalocyanine pigment composition according to claim 2.

7. The base ink for liquid ink according to claim 5, wherein the base ink for liquid ink is based on nitrocellulose resin.

* * * * *